United States Patent
Lesage et al.

(10) Patent No.: US 12,227,457 B2
(45) Date of Patent: Feb. 18, 2025

(54) ADMIXTURE FOR A CEMENTITIOUS MATERIAL TO INFLUENCE THE RHEOLOGY PROPERTIES OF THE CEMENTITIOUS MATERIAL

(71) Applicant: Universiteit Gent, Ghent (BE)

(72) Inventors: Karel Lesage, Nazareth (BE); Geert de Schutter, Erpe-Mere (BE)

(73) Assignee: Universiteit Gent, Ghent (BE)

( * ) Notice: Subject to any disclaimer, the term of this patent is extended or adjusted under 35 U.S.C. 154(b) by 828 days.

(21) Appl. No.: 17/287,544

(22) PCT Filed: Oct. 25, 2019

(86) PCT No.: PCT/EP2019/079129
§ 371 (c)(1),
(2) Date: Apr. 22, 2021

(87) PCT Pub. No.: WO2020/089048
PCT Pub. Date: May 7, 2020

(65) Prior Publication Data
US 2021/0317039 A1    Oct. 14, 2021

(30) Foreign Application Priority Data
Oct. 29, 2018  (EP) .................................. 18203032

(51) Int. Cl.
*C04B 24/32* (2006.01)
*B82Y 25/00* (2011.01)
(Continued)

(52) U.S. Cl.
CPC .......... *C04B 24/32* (2013.01); *C04B 24/2647* (2013.01); *H01F 1/344* (2013.01);
(Continued)

(58) Field of Classification Search
None
See application file for complete search history.

(56) References Cited

U.S. PATENT DOCUMENTS

2018/0037507 A1\* 2/2018 Zhang .................... C04B 28/00

FOREIGN PATENT DOCUMENTS

KR    101252741 B1 \*  1/2013  ............. F04B 49/08

OTHER PUBLICATIONS

Sakai et al ("Molecular Structure and Dispersion-Adsorption Mechanisms of Comb-Type Superplasticizers Used in Japan") J. Adv. Concrete Tech., vol. 1, No. 1, (2003), pp. 16-25). (Year: 2003).\*

(Continued)

*Primary Examiner* — Michael Forrest
(74) *Attorney, Agent, or Firm* — N.V. Nederlandsch Octrooibureau

(57) ABSTRACT

The invention relates to an admixture for a cementitious material suitable to influence the rheological properties of the cementitious material. The admixture includes a compound having a backbone chain provided with at least one first functionality and at least one second functionality. The at least one first functionality is adapted to adsorb to the cement particles of the cementitious material. The at least one second functionality is adapted to respond to an external trigger signal of an electric field, a magnetic field or an electromagnetic field, thereby influencing the rheological properties of the cementitious material. The rheological properties are influenced by influencing the interaction of the at least one first functionality with the cement particles and/or by influencing the interparticle interaction between the cement particles. The invention further relates to a cementitious material including such admixture. Further- (Continued)

more, the invention relates to a method and a system to control or influence the rheological properties of a cementitious material.

9 Claims, 13 Drawing Sheets

(51) Int. Cl.
  *B82Y 30/00* (2011.01)
  *B82Y 40/00* (2011.01)
  *C04B 24/26* (2006.01)
  *H01F 1/34* (2006.01)
(52) U.S. Cl.
  CPC ............... *B82Y 25/00* (2013.01); *B82Y 30/00* (2013.01); *B82Y 40/00* (2013.01)

(56) References Cited

OTHER PUBLICATIONS

Machine Translation of KR-101252741 (Year: 2013).*
Zhang et al, "The impact of the molecular weight on the electrochemical properties of poly(Tempo methacrylate)", Polymer Chemistry, vol. 8, No. 11, Jan. 1, 2017 (Jan. 1, 2017), pp. 1815-1823.
De Schutter et al, "Active control of properties of concrete: a (p)review", Materials an Structures, vol. 51, No. 5, Sep. 20, 2018 (Sep. 20, 2018), pp. 1-16.
Du Huili et al., "Preparation of copolymers containing nitroxyl radical and sulfonic acid and their catalytic performances", Chemical Industry and Engineering Progress, vol. 37, No. 2, pp. 708-713, Feb. 2018.

* cited by examiner

ADMIXTURE FOR A CEMENTITIOUS MATERIAL TO INFLUENCE THE RHEOLOGY PROPERTIES OF THE CEMENTITIOUS MATERIAL

FIELD OF THE INVENTION

The present invention relates to an admixture for a cementitious material suitable to actively influence the rheological properties of the cementitious material. The invention further relates to a cementitious material comprising such admixture. Furthermore, the invention relates to a method for processing a cementitious material and to a system for processing a cementitious material.

BACKGROUND ART

For many decades concrete constructional material was based on the three components cement, water and aggregates with the water to cement ratio as the major influencing factor for the performance of concrete. Recently, the development of innovative admixtures and the addition of such admixtures to concrete have significantly widened the applications of concrete. Admixtures can be described as chemical compounds that are added to the concrete mixture to enhance specific properties of the concrete.

However although the addition of admixtures can influence the rheology of concrete, placement problems of today's concrete remain. Examples of such placement problems comprise pump failure and formwork leakage. In the first case the concrete lacks fluidity at a given time and in the second case the concrete flows too easily at that particular time.

At present, one can only passively rely on the concrete rheology which is sensitive to an unknown number of different parameters whereby many of these parameters are not or only partly understood. The currently used admixtures only allow regulation of rheology through their addition time and dosage. In this way, the rheology is an output parameter than cannot be actively adjusted when it really matters, i.e. after the mixing phase, during pumping and/or casting.

In an attempt to reduce the placement problems of a cementitious material, the use of an external trigger signal has been proposed.

A first attempt comprises inline ultrasonic agitation of cement paste to disperse cement grains thereby shortening the setting time of concrete. This method however only allows speeding up the stiffening of the cementitious material and is preferentially applied to the cement paste before mixing with aggregates.

Another method uses an electromagnetic induction system in the form of coils wrapped around the outside of a pipe. By controlling the current through the inductors, magnetic fields are induced in the cementitious material flowing through the pipe. The induced magnetic field results in a spatial reorganization of the mixing water and in a reduced viscosity and an increased flow velocity of the cementitious material.

Furthermore, EP3284879 describes a method in which a cementitious material comprising pulverized silicon aluminum oxide and an activator comprising a hydroxide, a carbonate or water glass is subjected to an externally applied electric field to influence the setting time of the cementitious material.

SUMMARY OF THE INVENTION

It is an object of the present invention to provide an admixture for a cementitious material for controlling or influencing rheological properties of a cementitious material in an active way.

It is another object of the present invention to provide an admixture for a cementitious material having a functionality that allows to influence the rheology of the cementitious material that can be activated and/or deactivated whenever needed, i.e. at any time after the addition of the admixture to the cementitious material as for example during mixing, after mixing, during pumping, during casting, after casting for example during setting or hardening of the cementitious material.

It is a further object of the present invention to provide an admixture for a cementitious material having a functionality that may reversibly influence the rheological properties of the cementitious material in a controllable way.

It is still a further object of the present invention to provide an admixture for a cementitious material that has little or no substantial influence on the properties of the hardened cementitious material.

It is still a further object of the present invention to provide an admixture for a cementitious material that does not induce substantial undesirable changes in the structure or microstructure of the hardened cementitious material.

Furthermore, it is an object of the present invention to provide a method to control or influence the rheology of a cementitious material at any time during processing of the cementitious material.

Additionally, it is an object of the present invention to provide a system for controlling or influencing the rheology of a cementitious material.

According to a first aspect of the present invention, an admixture for influencing rheological properties of a cementitious material is provided.

The cementitious material comprises cement particles. For a person skilled in the art it is clear that the cementitious material in addition to the cement particles preferably also comprises water, aggregates and optionally further additives.

The admixture comprises a compound having a backbone chain provided with at least one first functionality and at least one second functionality. The compound comprises preferably a water-soluble compound.

The at least one first functionality is adapted to interact with the cement particles of the cementitious material. Preferably, the at least one first functionality is adapted to interact with the cement particles of the cementitious material by adsorbing to the cement particles of the cementitious material.

The at least one second functionality is adapted to respond to an external trigger signal, i.e. adapted to respond when an external trigger signal is activated, deactivated or changed. The external trigger signal comprises an electric field, a magnetic field or an electromagnetic field.

The responding of the second functionality may be reversible or irreversible.

The responding of the at least one second functionality is influencing the rheological properties of the cementitious material. The activation, deactivation or change of the external trigger signal is for example influencing the rheological properties of the cementitious material by influencing the interaction of the at least one first functionality with the cement particles, for example the adsorption of the first functionality to the cement particles. Alternatively or additionally, the activation, deactivation or change of the external trigger signal is influencing the rheological properties of the cementitious material by influencing the interparticle interaction between the cement particles, for example the interparticle distance between cement particles (while at least partially maintaining the interaction between said first functionality and said cement particles). Possibly, the activation, deactivation or change of the external trigger signal is influencing the rheological properties of the cementitious material by influencing both the interaction of the at least one first functionality with the cement particles, for example the adsorption of the at least one first functionality to the cement particles, and the interparticle interaction between cement particles, for example the interparticle distance between cement particles.

The backbone chain may comprise any type of polymer or polymeric group. With polymer or polymeric group is meant a structure comprising multiple repetitions of units derived from molecules of low relative molecular mass.

Examples of polymers or polymeric groups comprise polyesters, polyacrylates, polyurethanes, polyethylene oxide, polymethacrylate, polystyrene, copolymer of acrylate, poly(methyl methacrylate), methacrylate and/or styrene, poly(isobornyl acrylate), polyacrylonitrile, polyether, polylactic acid, polyamide, polyester amide, polycarbonate, polysiloxanes, and/or block, comb and/or star copolymers of such polymers or polymeric groups. The polymers or polymeric groups can be substituted or grafted, for example with one or more side chain for example polyoxyalkyne side chains such as polyethylene oxide (PEO) and/or polypropylene oxide (PPO). The grafting may comprise, but is not limited to ester, ether, amide and/or imide. The compound preferably comprises a plasticizer, preferably a water-soluble plasticizer, provided with at least one first functionality and at least one second functionality. More preferably, the compound comprises a superplasticizer, preferably a water-soluble superplasticizer, provided with at least one first functionality and at least one second functionality.

A preferred way to influence the interaction of the at least one first functionality with the cement particles is by influencing the adsorption of the at least one first functionality to the cement particles. The adsorption of the at least one first functionality to the cement particles may be influenced either by increasing the adsorption capacity of the at least one first functionality to the cement particles or by decreasing the adsorption capacity of the at least one first functionality to the cement particles.

A preferred way to influence the interparticle interaction between cement particles, for example the interparticle distance between cement particles, is by influencing the steric effect provided by the compound for example provided by the second functionality. The steric effect of the second functionality is for example provided by a sterically active group of the second functionality. Influencing the steric effect may comprise an increase or a decrease of the steric effect.

An alternative way to influence the interparticle interaction between cement particles, for example the interparticle distance between cement particles, is by inducing a reorganization of the second functionalities of the compound, for example by inducing an attraction or repulsion for example between the second functionalities of the compound. The attraction or repulsion comprises for example a magnetic attraction or repulsion.

As mentioned above the compound comprises at least one first functionality. Possibly, the compound comprises more than one first functionality.

In case the compound comprises more than one first functionality, the functionalities of the compound may be the same or the compound may comprise a number of different first functionalities, for example provided by chemically different compounds or functional groups.

Any type of functionality adapted to interact with the cement particles of the cementitious material can be considered as first functionality. The first functionality interacts with the cement particles by adding (and mixing) the compound to the cementitious material and thus do not require an external trigger signal to be activated, deactivated or changed.

Preferred types of first functionalities comprise functionalities adapted to adsorb to the cement particles of the cementitious material.

A preferred group of first functionalities comprises negatively charged functional groups. Preferred examples of negatively charged functional groups are selected from, but not limited to, the group consisting of carboxylate functional groups and sulphonate functional groups. Examples of carboxylate functional groups comprise formate, acetate, oxalate and lactate. Examples of sulphonate functional groups comprise methanesulphonate and ethanesulphonate.

In particular embodiments of the invention, the admixture comprises a compound having a backbone chain provided with carboxylate functional groups as first functionalities.

As mentioned above the compound comprises at least one second functionality. Possibly, the compound comprises more than one second functionality.

In case the compound comprises more than one second functionality, the functionalities of the compound may be the same or the compound may comprise a number of different second functionalities, for example provided by chemically different compounds or functional groups.

Any type of functionality adapted to respond to an external trigger signal whereby the responding of the external trigger signal is influencing the rheological properties of the cementitious material can be considered.

The external trigger signal comprises for example an electric field, a magnetic field or an electromagnetic field. In case the external trigger signal comprises an electric field, the second functionality comprises preferably an electroresponsive functionality; in case the external trigger signal comprises a magnetic field, the second functionality comprises a magnetoresponsive functionality; in case the external trigger signal comprises an electromagnetic field, the second functionality comprises an electromagnetic responsive functionality.

A first group of second functionalities comprises functionalities or compounds providing a steric effect and being adapted to respond to an external trigger signal thereby changing the steric effect of the second functionality. With steric effect is meant the effect manifested when two or more groups, atoms or compounds come in close proximity to each other and their potential overlap of electron clouds hinders further approaching. For the purpose of this invention, the steric effect of the second functionality refers to the steric effect towards cement particles and thus to the effect manifested when the second functionality comes in close proximity to cement particles, in particular to a steric group or to steric groups of other cement particles.

Optionally, the second functionality consists of or comprises a sterically active group. Examples of sterically active groups comprise compounds providing steric hindrance such as compounds comprising linear or cyclic structural units of which the total length is optimized in function of the aimed rheology. An example comprises a polyethylene oxide (PEO) (also known as polyoxyethylene) group of formula $(CH_2CH_2O)_q$, with q preferably ranging between 1 and 50, more preferably from 1 to 30 or from 12 to 25.

The sterically active group may itself be responsive to an external trigger signal to influence its steric effect. Alternatively or additionally, the second functionality may comprise a sterically active group and a responsive element, for example an electroresponsive, magnetoresponsive or electromagnetic responsive element in addition to the sterically active group.

The responsive element can for example be a linking group for linking the sterically active group to the backbone chain or can be a group positioned down the sidechain of the sterically active group. Examples of linking groups or groups positioned down the sidechain of the sterically active groups comprise compounds selected from the group consisting of monomers of aniline, vinyl aniline, pyrrole and thiophene. An example comprises poly(3,4-ethylene dioxythiophene) (PEDOT) which can interact with for example the covalently bound (—$S(OH)_3$)-groups at the end of a side chain to alter the polymer configuration and the steric effect provided by the polymer.

The steric effect of the second functionality and preferably of the sterically active group of the second functionality is for example changed as response to an external trigger signal by reorganizing, for example spatially reorganizing the second functionality and preferably the sterically active group of the second functionality as response to an external trigger signal. The second functionality and preferably the sterically active group of the second functionality is for example spatially reoriented towards the backbone chain or spatially collapsed as response to an external trigger signal.

The steric effect of the second functionality and preferably of the sterically active group of the second functionality can furthermore be changed as response to an external trigger signal by inducing shrinking or swelling of the second functionality and preferably of the sterically active group of the second functionality.

Furthermore the steric effect of the second functionality and preferably of the sterically active group of the second functionality can be changed as response to an external trigger signal by releasing at least part of the second functionality for example of the sterically active group of the second functionality. The second functionality or at least part of the functionality can for example be released by a responsive element as for example a responsive linking group as response to an external trigger signal.

In a preferred example, the admixture according to the present invention comprises a backbone chain provided with negatively charged functional groups as first functionality and a sterically active group comprising compounds providing steric hindrance such as compounds comprising linear or cyclic structural units of which the total length is optimized in function of the aimed rheology, such as a polyethylene oxide (PEO) group of formula $(CH_2CH_2O)_q$, with q preferably ranging between 1 and 50, more preferably from 1 to 30 or from 12 to 25.

A second group of second functionalities comprises functionalities or compounds, for example electroactive compounds, comprising at least one localized site or group adapted to be oxidized (by losing electrons) or adapted to be reduced (by gaining electrons) by activating, deactivating or changing an external trigger signal, preferably by activating, deactivating or changing an external electric field. Preferably, the at least one localized site or group is adapted to be oxidized to form a cation upon activation of the external trigger signal, for example upon activation of the applied electric field.

The electroactive compounds comprise for example (electroactive) polymer macromolecules.

The oxidation or reduction of the at least one site or group preferably influences the interaction of the first functionality with the cement particles, the interaction of the second functionality with the cement particles or both the interaction of the first functionality and the second functionality with the cement particles. In preferred embodiments the oxidation or reduction of the at least one site or group influences the interaction of the first functionality to the cement particles, for example the adsorption of the first functionality to the cement particles. The interaction of the first functionality with the cement particles, such as the adsorption of the first functionality to the cement particles, is for example influenced as the negative charge of the negatively charged functional group is at least partially reduced upon activation or change of the external trigger signal.

Preferred examples of localized sites or groups comprise compounds selected from the group consisting of nitroxyl, verdazyl, phenoxyl, carbazoles, quinones, viologens or hydrazyl.

A particularly preferred localized site or group comprises a nitroxide free radical adapted to be oxidized to form an oxoammonium cation such as a TEMPO radical (2,2,6,6-tetramethylpiperidine-1-oxyl) or a derivative of a TEMPO radical.

In a preferred example, the admixture according to the present invention comprises a backbone chain provided with negatively charged functional groups as first functionality and a free radical, preferably a TEMPO radical, oxidizable to form a cation upon activation or change of the external trigger signal as second functionality. The TEMPO radical will respond to the electrical trigger signal and will neutralize the negative charge of the first functionality. Because of the reduced (or totally neutralized) negative charge of the water-soluble compound, the water-soluble compound will show a reduced adsorption capacity to adsorb at the surface of the cement particles. Consequently, the interparticle interaction between cement particles, as for example the interparticle distance between cement particles will be influenced.

A third group of second functionalities comprises functionalities or compounds comprising at least one magnetizable component, such as at least one magnetizable particle, preferably at least one magnetizable nanoparticle.

The second functionality and in particular the magnetizable component of the second functionality is adapted to respond to the activation, deactivation or change of an external trigger signal, in particular to respond to the activation, deactivation or change of a magnetic field. By the activation or change of the external trigger signal, in particular the magnetic field, the magnetizable components respond to the external trigger signal, in particular to the magnetic field and will start forming a cluster of connected or partially connected components along the magnetic field lines. As the compound interacts with (preferably adsorbs to) the cement particles by means of the first functionality, the cement particles become magnetizable. The activation or change of the external trigger signal, in particular the magnetic or electromagnetic field will thus have an influence on the interparticle interaction and in particular on the interparticle distance between cement particles.

The at least one magnetizable component may comprise any type of particle, particulate, nanoparticle or powder that is magnetizable. The at least one magnetizable component comprises for example any type of particle, particulate, nanoparticle or powder comprising a metal, metal alloy or metal oxide. The at least one magnetizable component comprises for example metal powder or fly ash. Other preferred magnetizable components comprise metal or metal oxide particles, particulates, nanoparticles or powder as for example iron or iron oxide (for example $Fe_3O_4$) particles, particulates, nanoparticles or powder, nickel or nickel oxide particles, particulates, nanoparticles or powder or cobalt or cobalt oxide particles, particulates, nanoparticles or powder.

With 'comprising a magnetizable component' is meant that the at least one second functionality is provided with or interacting with a magnetizable component, such as a magnetizable particle. Examples of interaction comprise chemical bonding, adsorption or interaction by means of a linking or adhesive group, as for example dopamine methacrylate (DMA), based on catechol.

In addition to the at least one first functionality and the at least one second functionality, the admixture optionally comprises one or more additional functionalities. Examples of such additional functionalities are functionalities comprising one or more sterically active groups. Examples of sterically active groups comprise compounds providing steric hindrance as for example compounds comprising one or more linear or cyclic structural unit of which the length is optimized in function of the aimed rheology of the cementitious material. An example comprises a polyethylene oxide (PEO) group of formula $(CH_2CH_2O)_s$, with s ranging from 1 to 50, preferably from 1 to 30, for example from 12 to 25.

In a preferred example, the admixture according to the present invention comprises a backbone chain provided with negatively charged functional groups as first functionality and comprising a second functionality comprising a magnetizable component, such as a magnetizable particle. The magnetizable component, for example the magnetizable particles is for example linked to the backbone chain of the admixture by chemical bonding, adsorption, or by means of a linking or adhesive group, for example dopamine methacrylate (DMA) based on catechol.

According to a second aspect of the present invention, a cementitious material comprising the above described admixture is provided.

The admixture is preferably present in a concentration lower than 5% by mass of the cement content of the cementitious material. More preferably the admixture is present in a concentration lower than 2% by mass of the cement content of the cementitious material, for example in a concentration range from 0.3 to 1.5% by mass.

The admixture can be added to the cementitious material before or during the mixing of the cementitious material. In a preferred way the admixture is added to the cementitious material by adding the admixture to the mixing water.
It is clear that the cementitious material may further comprise one or more additives, as for example additives known in the art.

According to a third aspect of the present invention, a method to control or influence rheological properties of a cementitious material is provided. The method comprises the steps of
providing a flow of a cementitious material comprising an admixture as described above, the admixture comprising a backbone chain, the backbone chain is provided with at least one first functionality and is provided with at least one second functionality;
conveying the flow of the cementitious material through a channel and optionally through a nozzle;
applying the flow of the cementitious material in a formwork or to a work surface;
activating, deactivating and/or changing an external trigger signal to activate or deactivate said at least one second functionality.

The activation, deactivation or change of the external signal may influence the adsorption of the admixture to the cement particles of the cementitious material, for example the adsorption of the admixture to the cement particles of the cementitious material.

Alternatively or additionally, the activation, deactivation or change of the external signal may influence the interparticle interaction, for example the interparticle distance, between cement particles of the cementitious material. The activation, deactivation or change of the external signal may for example influence the steric effect provided by at least one second functionality. The activation, deactivation of change of the external signal may also result in a reorganization of the second functionalities. Such reorganization of the second functionalities may for example induce a reorganization of the cement particles in the cementitious material, for example by magnetic attraction or repulsion.

It is clear that the activation, deactivation or change of the external signal may also have other influences on the admixture, for example an influence on the at least one first functionality or on additional functionalities of the admixture.

The admixture is preferably added to the cementitious material, for example to a flow of the cementitious material. Preferably, the cementitious material and the admixture are mixed, for example during or after the addition of the admixture to the cementitious material.

As channel any type of channel or tube suitable to convey a flow of cementitious material comprising the admixture can be considered. Examples comprise flexible or rigid channels and open, half-open or closed channels. A preferred example of a channel comprises a chute.

The channel is for example adapted to convey the flow of the cementitious material from a mixing unit to the formwork or work surface.

As nozzle any device suitable to apply a flow of cementitious material in a formwork or to a work surface can be considered. A preferred example of a nozzle comprises a printing head.

As mentioned above, the external trigger signal preferably comprises an electric, magnetic or electromagnetic field.
In case the external trigger signal comprises an electric field, the electric field strength that is applied to induce a response of the second functionality preferably ranges between 0.1V/mm and 1.3V/mm. In case the external trigger signal comprises a magnetic field, the magnetic field strength that is applied to induce a response of the second functionality preferably ranges between 0.001 Tesla and 1 Tesla, between 0.01 Tesla and 1 Tesla or between 0.03 Tesla and 1 Tesla. The magnetic field strength that is applied is for example 0.1 Tesla, 0.25 Tesla, 0.5 Tesla or 0.75 Tesla.
The frequency of the oscillation of the magnetic field applied to induce a response of the second functionality ranges preferably between 1 Hz and 100 Hz or between 10 Hz and 100 Hz. The frequency of the oscillation of the magnetic field that is applied is for example 20 Hz, 50 Hz or 100 Hz.

The external trigger signal can for example be activated, deactivated or changed after the mixing of the admixture to the cementitious material, during pumping of the flow of cementitious material, during conveying of the flow of cementitious material, before or after application of the cementitious material in the formwork or to the working surface (i.e. during the setting and/or during the hardening of the cementitious material).

The external trigger signal is for example applied by a generator, for example a generator for generating an electric field, a magnetic field or an electromagnetic field, or by a permanent magnet.

By activating, deactivating or changing the external trigger signal the rheology of the cementitious material can be influenced or controlled in an active way. This is considered as a major advantage compared to methods to influence the rheology of a cementitious material known in the art.

A preferred method according to the present invention further comprises the step of determining the rheological properties of the cementitious material and activating, deactivating or changing the external trigger signal in case the rheological properties do not fall within a predetermined range.

This additional step is preferably performed by means of a controller. Preferably, the controller compares the determined rheological properties with a predetermined range of rheological properties. In case the determined rheological properties are outside the predetermined range, the controller may activate, deactivate or change the external trigger signal, for example by activating, deactivating or changing a generator for generating an electric field, a magnetic field or an electromagnetic field.

The rheological properties of the cementitious material can be determined continuously or at predetermined moments and/or with predetermined intervals, for example by using appropriate equipment, for example rheology sensors such as inline rheology sensors or by visual inspection.

The rheological properties of the cementitious material can be determined during mixing, for example in the mixing unit; during the conveying of the flow of the cementitious material and/or during the application of the cementitious material in a formwork or to a work surface.

The controller may comprise a computer device. Alternatively, the controller may be a person, for example a person that is visually inspecting the rheological properties of a flow of cementitious material and that is activating, deactivating or changing an external trigger signal, for example by activating, deactivating or changing a generator for generating an electric field, a magnetic field or and electromagnetic field in case the rheological properties are outside a predetermined range.

A preferred method to convey the flow of the cementitious material and/or to apply the cementitious material in a formwork or to a working surface comprises 3D printing.

In a 3D printing method, the rheological properties of the cementitious material are preferably controlled and/or influenced in or near the printing head of the 3D printer.

A particular preferred method according to the present invention comprises the steps of
  providing a flow of a cementitious material comprising an admixture as described above, the admixture comprising a backbone chain, the backbone chain is provided with at least one first functionality and is provided with at least one second functionality;
  conveying the flow of the cementitious material through a channel and optionally through a nozzle;
  applying the flow of the cementitious material in a formwork or to a work surface;
  determining the rheological properties of the cementitious material, preferably during the conveying of the flow of the cementitious material or during the application of the flow of the cementitious material; comparing the determined rheological properties of the cementitious material with a predetermined range of rheological properties and activating, deactivating or changing an external trigger signal to activate or deactivate said at least one second functionality in case the determined rheological properties do not fall within the predetermined range of rheological properties.

According to a fourth aspect of the present invention, a system for controlling or influencing rheological properties of a cementitious material is provided. The system comprises
  a channel for conveying a cementitious material in fluid state, the cementitious material comprising an admixture comprising a backbone chain provided with at least one first functionality and at least one second functionality
  a generator for generating an electric field, a magnetic field and/or an electromagnetic field; and
  a controller for controlling the rheological properties of the cementitious material and for regulating the activation, deactivation or change of said generator to activate and/or deactivate said second functionality.

Optionally, the channel for conveying the cementitious material is provided with a nozzle, as for example provided with a printing head.

In a preferred embodiment the generator is positioned in the channel for transferring the cementitious material or at close distance from the channel.

In alternative embodiments the generator is positioned in or close to the nozzle, for example in or close to the printing head.

In alternative embodiments the generator is positioned at close distance from the cementitious material during setting or hardening of the cementitious material, for example close to the formwork provided with the cementitious material. It is clear that a system for controlling or influencing rheological properties of a cementitious material according to the present invention may comprise more than one generator for generating an electric field, a magnetic field or an electromagnetic field, for example one generator positioned close to the channel or nozzle for conveying the cementitious material and one generator positioned close to the cementitious material during setting or hardening.

The system may further comprise a mixing unit, for mixing the cementitious material and the admixture.

According to a fifth aspect of the present invention, the use of an admixture for a cementitious material as described above for controlling or influencing rheological properties of a cementitious material is provided.

BRIEF DESCRIPTION OF THE DRAWINGS

The present invention will be discussed in more detail below, with reference to the attached drawings, in which:

FIG. 1a shows the admixture before the application of an external trigger signal and FIG. 1b shows the effect induced by the application of an external trigger signal;

FIG. 2a shows the admixture before the application of an external trigger signal and FIG. 2b shows the effect induced by the application of an external trigger signal;

DESCRIPTION OF EMBODIMENTS

Figure 1B:
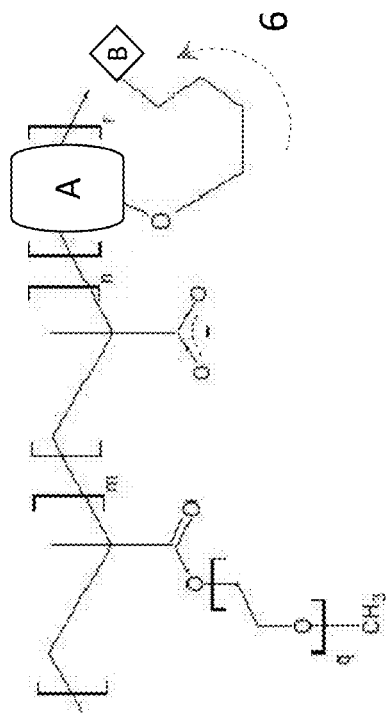
FIG. 1a and FIG. 1b show schematic illustrations of a first example of an admixture according to the present invention, whereby

The present invention will be described with respect to particular embodiments and with reference to certain drawings but the invention is not limited thereto but only by the claims. The drawings are only schematic and are non-limiting. The size of some of the elements in the drawings may be exaggerated and not drawn on scale for illustrative purposes. The dimensions and the relative dimensions do not correspond to actual reductions to practice of the invention.

The terms first, second and the like used in the description as well as in the claims, are used to distinguish between similar elements and not necessarily describe a sequence, either temporally, spatially, in ranking or in any other manner. It is to be understood that the terms so used are interchangeable under appropriate circumstances and that the embodiments of the invention described herein are capable of operation in other sequences than described or illustrated herein.

When describing the invention, the terms used are construed in accordance with the following definitions, unless indicated otherwise.

The term "and/or" when listing two or more items, means that any one of the listed items can by employed by itself or that any combination of two or more of the listed items can be employed. In particular the term "activating, deactivating and/or changing' or "activation, deactivation and/or change" includes either activating, either deactivating, either changing, as well as any combination for example activating followed by deactivating or deactivating followed by activating.

When referring to the endpoints of a range, the endpoints values of the range are included.

The term "cementitious material" refers to materials comprising cement as for example concrete or mortar and includes fresh cementitious material, partially or fully hardened cementitious material. For a person skilled in the art, it is clear that cementitious material also comprises water and aggregates. Cementitious material may further comprise other additional components and/or additives, such as additional components and/or additives known in the art, in particular mineral additional components and/or additives, for example mineral additional components and/or additives in powder form.

The term "cement" refers to materials capable of binding aggregate particles together and includes for example Portland cement, calcium aluminate cement, lime, gypsum, geopolymer cement or other inorganic binders that provide positive electrostatic charges at least locally at their particle surface.

The term "aggregates" refers to granular material and comprises for example sand, gravel, crushed stones and iron blast-furnace slag. The granular material has preferably an average particle size that is several times larger than the average particle size of the cement particles.

The term "placing", also referred to as "pouring", relates to the process of transferring fresh concrete from the mixing unit to the place where it is to harden, generally the framework.

The term "setting" refers to the stiffening of the cementitious material and relates to the changes of the cementitious material from a fluid to a solid state.

The term "hardening", also referred to as "curing", relates to the gain of strength of a cementitious material (although during setting of the cementitious material some strength is acquired).

The term "processing cementitious material" refers to any of the process steps or any combination of the process steps including mixing, pumping, conveying, placing, setting and hardening of cementitious material.

The term "fresh" refers to cementitious material that has been (recently) mixed and is still fluid.

The term "hardened" refers to cementitious material that has gained enough strength to bear (some) load.

The term "admixture" refers to material other than water, aggregates and cement used as ingredient of a cementitious material to modify its (freshly) mixed, setting or hardened properties added before or during mixing.

The term "plasticizer" or "water reducing admixture" refers to an admixture that either increases slump of (freshly) mixed cementitious material without increasing water content or maintain slump with a reduced amount of water.

The term "superplasticizer" also referred to as "high-range water reducing admixture" relates to an admixture capable of producing large water reduction or great flowability without causing undue set retardation or entrainment of air in the cementitious material.

The term "formwork" refers to the system of supporting freshly placed cementitious material.

The term "3D printing" refers to an additive manufacturing technique comprising the joining of material to produce objects, layer upon layer, from 3D model data or other electronic data source. In particular, 3D printing refers to a technique comprising the joining of successive layers of material under computer control by means of an industrial robot.

EXAMPLES

1. First Type of Examples

Figure 1A:
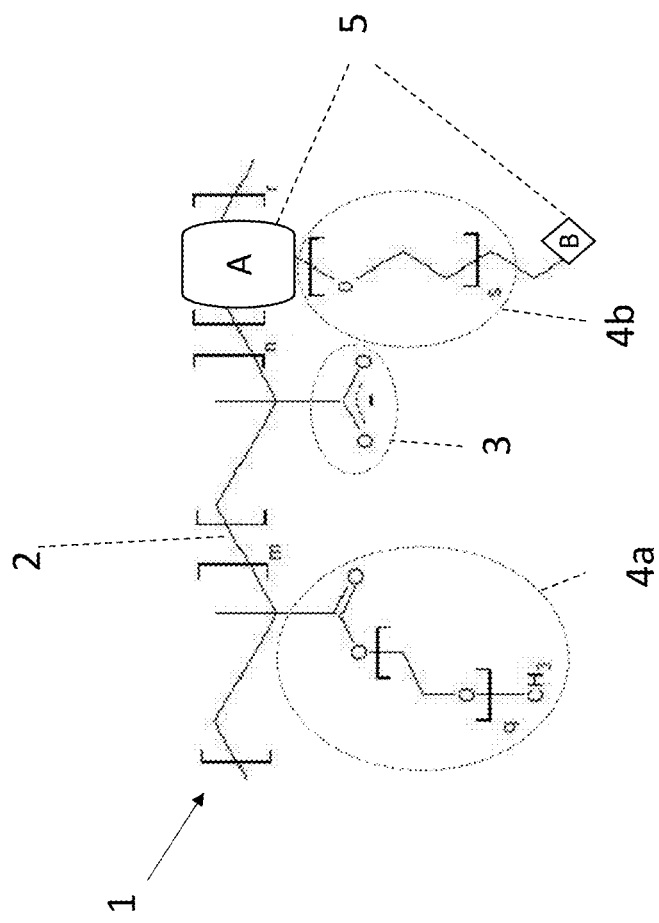

A first example of an admixture 1 according to the present invention is schematically represented in FIG. 1a and FIG.

1b. FIG. 1a shows the admixture 1 before the application of the external trigger signal. FIG. 1b shows the effect induced by the application of the external trigger signal. The admixture 1 comprises a backbone 2 provided with at least one first functionality 3 and at least one second functionality 5. The second functionality 5 comprises one or more sterically active groups 4b for providing sterical hindrance between neighbouring cement particles.

Optionally, the backbone 2 is further provided with one or more additional functionalities 4a. Examples of such additional functionalities 4a are functionalities comprising a sterically active group.

The backbone 2 comprises a polymer backbone for example a polymer backbone comprising acrylic, methacrylic, maleic acid, and related monomers, possibly grafted with one or more polyoxyalkylene side chains such as polyethylene oxide (PEO) and/or polypropylene oxide (PPO). The grafting may comprise, but is not limited to ester, ether, amide and/or imide.

The at least one first functionality 3 comprises for example a negatively charged group, such as a $COO^-$ group, adapted to adsorb to the cement particles of the cementitious material when the admixture is added to and optionally mixed with the cement particles of the cementitious material.

The at least one second functionality 5 comprises for example a sterically active group 4b, such as a polyethylene oxide (PEO) group of formula $(C_2H_2CH_2O)_s$, with s preferably ranging between 1 and 50, for example between 1 and 10. The sterically active group 4b may be responsive to the external trigger signal to influence its steric effect. Optionally, the second functionality 5 comprises a responsive element such as a responsive linking group A for linking the sterically active group 4b to the backbone chain 2 and/or the second functionality comprises a responsive group B positioned down the sterically active group 4b.

The optional sterically active group 4a comprises for example a side chain such as polyethylene oxide (PEO) groups of formula $(CH_2CH_2O)_q$, with q preferably ranging from 1 to 50, more preferably from 1 to 30, for example from 12 to 25.

When the admixture 1 is added to the cementitious material, the negatively charged groups adsorb to the cement particles. Preferably, the cementitious material is mixed during or after the addition of the admixture 1.

As long as no external trigger signal is applied (FIG. 1a), the admixture 1 acts as a superplasticizer known in the art, with steric hindrance as the main mechanism. However, when an appropriate external trigger signal, for example an electromagnetic signal, is applied (FIG. 1b), the steric effect provided by the second functionality 5 is changed. In the example shown in FIG. 1b the second functionality responds by a spatial reorganization of the sterically active group as indicated in FIG. 1b by arrow 6.

It is clear that the application of the external trigger signal, for example the electromagnetic signal, may also influence the steric effect of one or more additional functionalities 4a.

By activating or changing the external trigger signal, for example an electromagnetic signal, the rheology of the cementitious material can be influenced or controlled in an active way and this at any time during the processing of the cementitious material, for example during placing or setting of the cementitious material.

2. Second Type of Examples 2.1 General Description

Figure 2B:
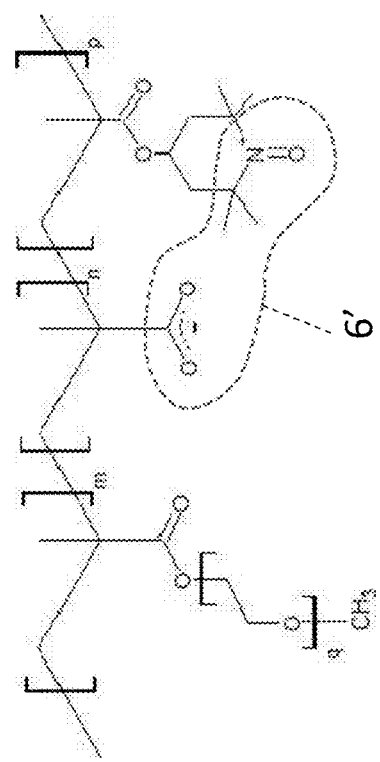
FIG. 2a and FIG. 2b show schematic illustrations of a second example of an admixture according to the present invention, whereby
Figure 2A:
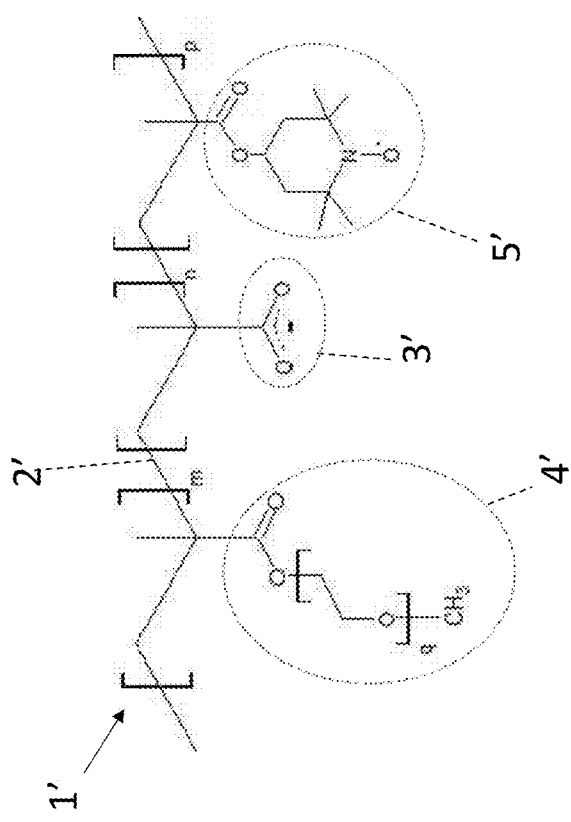

A second example of an admixture 1' according to the present invention is schematically represented in FIG. 2a and FIG. 2b. FIG. 2a shows the admixture 1' before the application of the external trigger signal. FIG. 2b shows the effect induced by the application of the external trigger signal. The admixture 1' comprises a backbone 2' provided with at least one first functionality 3'. The backbone 2' is further provided with at least one second functionality 5'.

Optionally, the backbone 2' is further provided with one or more additional functionalities 4'. Examples of such additional functionalities 4' are functionalities comprising a sterically active group.

The backbone 2' comprises a polymer backbone for example a polymer backbone comprising acrylic, methacrylic, maleic acid, and related monomers, possibly grafted with one or more polyoxyalkylene side chains such as polyethylene oxide (PEO) and/or polypropylene oxide (PPO). The grafting may comprise, but is not limited to ester, ether, amide and/or imide.

The at least one first functionalities 3' comprises for example a negatively charged group, such as a $COO^-$ group, adapted to adsorb to the cement particles of the cementitious material when the admixture is added to and optionally mixed with the cement particles of the cementitious material.

The at least one second functionality 5' comprises a compound comprising at least one site or group adapted to be oxidized or adapted to be reduced. A preferred second functionality 5' comprises a localized group or site comprising a nitroxide free radical adapted to be oxidized to form an oxoammonium cation such as a TEMPO radical (2,2,6,6-tetramethylpiperidine-1-oxyl) or a derivate of a TEMPO radical.

The optional sterically active group 4' comprises for example a side chain such as polyethylene oxide (PEO) groups of formula $(CH_2CH_2O)_q$, with q preferably ranging from 1 to 50, more preferably from 1 to 30, for example from 12 to 25.

When the admixture 1' is added to the cementitious material, the negative groups of the first type of the first functionality 3' will adsorb to the cement particles, while the optional additional functionalities 4' will provide a steric effect. The cementitious material is preferably mixed during or after addition of the admixture 1'.

Without application of an external trigger signal the TEMPO radicals of the second functionalities 5' are neutral. Consequently, the negatively charged functional groups will remain absorbed to the cement particles.

However, by application of the external trigger signal, for example an electromagnetic signal, the TEMPO radical will form a cation. The positive charge of the cation will at least partially neutralize the negative charge of the negatively charged first functionalities 3'. The process of charge neutralization of the negatively charged functional groups 3' is shown by 6' in FIG. 2b.

As a result, the negative charge of the admixture 1' will be reduced or even totally neutralized, and the admixture 1' shows a reduced adsorption capacity to the cement particles.

It is clear that the application of the external trigger signal, for example the electromagnetic signal, may also influence the steric effect of one or more additional functionalities 4'.

The response of the admixture according to the second example is reversible, as the reduction-oxidation process controlled by the trigger signal is reversible. In this way, a controllable adsorption of the superplasticizer and consequently a controllable rheology of the cementitious material is obtained.

2.2 Synthesis and Responsive Effect a. Synthesis of Redox-Responsive Copolymers

A first admixture, referred to as Poly(MAA-co-PEGMA500-co-TEMPO), was synthesized starting from methylacrylate (MAA), poly(ethylene glycol)methacrylate ($M_n$ 500 Da) (PEGMA$_{500}$) and 2,2,6,6-tetramethylpiperidine-1-oxyl (TEMPO).

A second admixture not having PEGMA side chains, referred to as Poly(MAA-co-TEMPO), was synthesized starting from MAA and TEMPO.

The products have been characterized after synthesis, confirming the expected polymer structure.

b. Redox-Responsiveness of the Polymers

Redox-responsiveness of the polymers (Poly(MAA-co-PEGMA500-co-TEMPO) and Poly(MAA-co-TEMPO)) was checked by cyclic voltammetry. Cyclic voltammetry graphs were recorded in an aqueous solution of the polymers (0.02 M of TEMPO in the presence of an electrolyte (LiClO$_4$ or NaOH)). The samples were positioned on a screen printed electrode (DropSens®) that was connected to a potentiostat (Gamry®). The measurements were performed at a scan rate of 5 mV/s.

Figures 4A, 4B:
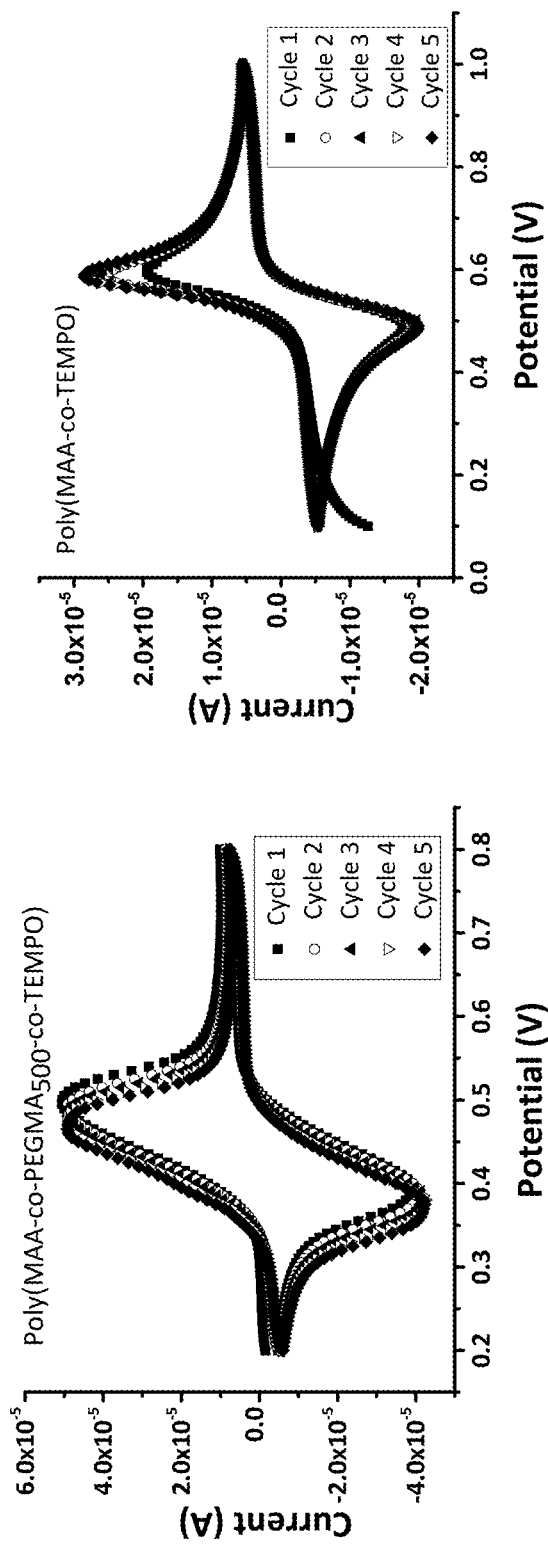
FIG. 4a shows cyclic voltammetry graphs on Poly(MAA-co-PEGMA500-co-TEMPO) in water containing 0.1 M $LiClO_4$ as electrolyte
FIG. 4b shows cyclic voltammetry graphs of Poly(MAA-co-TEMPO) in an alkaline (NaOH) electrolyte.

FIG. 4a shows cyclic voltammetry graphs on Poly(MAA-co-PEGMA500-co-TEMPO) in water containing 0.1 M LiClO$_4$ as electrolyte. FIG. 4b shows cyclic voltammetry graphs of Poly(MAA-co-TEMPO) in an alkaline (NaOH) electrolyte.

FIG. 4a and FIG. 4b clearly indicate the redox-responsiveness of the polymers. FIG. 4a and FIG. 4b furthermore show that the curves are repeatable. The required voltage levels are low enough to be applicable in cement paste.

c. Experimental Verification of Plasticizing Efficacy

Figure 5:
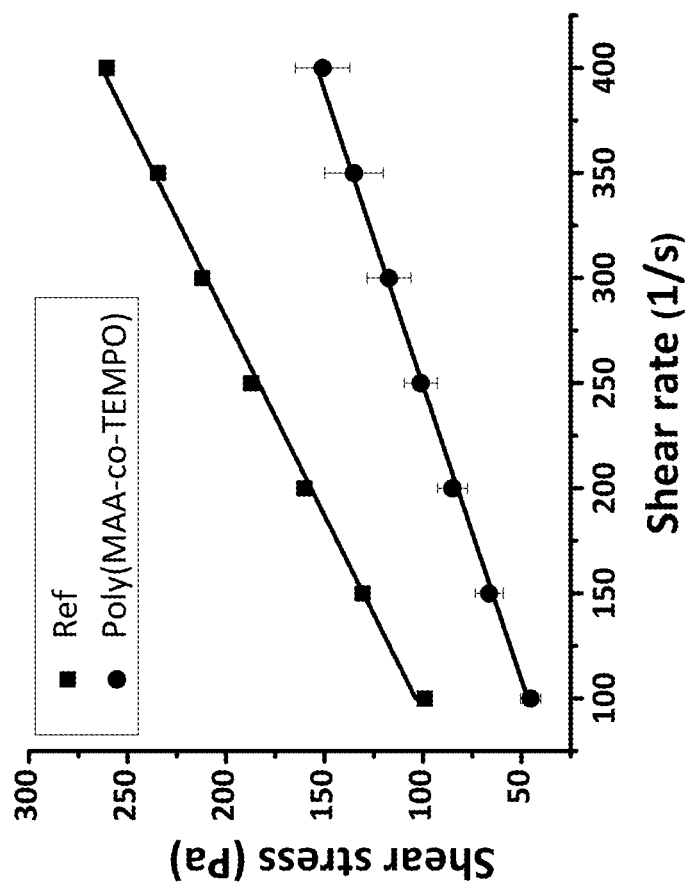
FIG. 5 shows the shear stress as a function of shear rate of a paste (W/C of 0.4) without admixture (reference) and comprising an admixture of the second type (Poly(MAA-co-TEMPO)

The plasticizing effect of the polymers Poly(MAA-co-PEGMA500-co-TEMPO) and Poly(MAA-co-TEMPO) was evaluated by rheometry. Cement pastes containing a predetermined amount of the polymers Poly(MAA-co-PEGMA500-co-TEMPO) and Poly(MAA-co-TEMPO) were prepared, the paste samples were loaded in a parallel plate rheometer (Anton Paar®) and sample conditions were checked. Subsequently, the shear rate was varied from 100 to 400 s$^{-1}$ and the shear stress was measured. The results (shear stress as a function of shear rate) are shown in FIG. 5 for a reference cement past with water to cement ratio (W/C) of 0.4 and without admixture, and for the same paste including a predetermined amount of Poly(MAA-co-TEMPO).

Experiments demonstrated that the plasticizing effect can be limited to strong, depending on the detailed architecture of the redox-responsive polymer. A clear plasticizing effect was noticed for Poly(MAA-co-TEMPO) as shown in FIG. 5.

d. Experimental Verification of Rheological Response

The rheological response of the polymers Poly(MAA-co-PEGMA500-co-TEMPO) and Poly(MAA-co-TEMPO) was evaluated using combined rheometry and voltammetry. A rudimentary setup was assembled in which the paste was positioned on a screen printed electrode (DropSens®) similar to the setup in Ping et al. (DOI: 10.1038/ncomms9050). The electrodes served as the static bottom plate while a top geometry sheared the paste as it was connected to the rotating part of the rheometer. The shear rate was constant throughout all these experiments and the shear stress was registered by the top geometry.

Figure 6B:
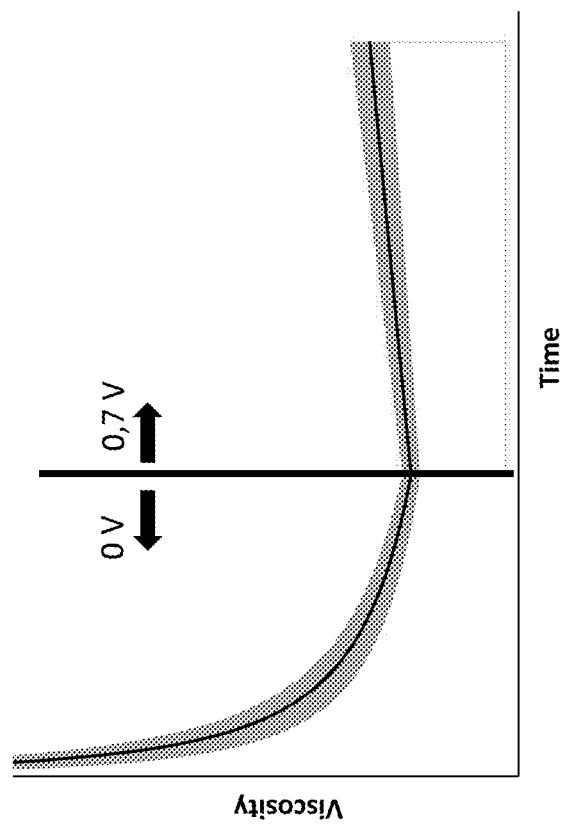
FIG. 6a and FIG. 6b compare the viscosity evolution of cement paste without (FIG. 6a) and with (FIG. 6b) addition of an admixture according to the present invention before and after application of 0.7 V.
Figure 6A:
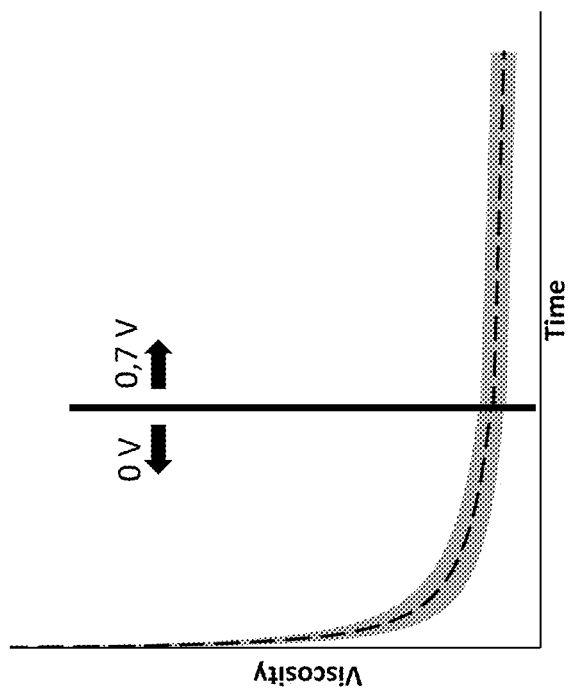

FIG. 6a and FIG. 6b show the viscosity evolution for both the reference paste (FIG. 6a) without admixture and the same paste with Poly(MAA-co-TEMPO) (FIG. 6b) is shown. The grey colored areas in FIG. 6a and FIG. 6b embracing the curves indicate the standard deviation intervals. Only fitted data are shown and axis labels are omitted because of the rudimentary character of the employed setup.

For both types of pastes, there is an initial decrease in viscosity observed due to flow startup phenomena. This decrease was fitted with a power law curve. Up to the vertical line (i.e. at 120 s) indicated in FIG. 6a and FIG. 6b, no electric field was applied.

At 120 s the electrodes were set and maintained at 0.7 V. It can be observed that once the voltage is applied, the linear behavior of both types of pastes deviates. For the reference paste without admixture, the slope of the fit is −2.8 and for the paste with admixture the slope is 12.7. This clearly demonstrates the electrochemical trigger response of the admixture, as all other factors remain constant.

3. Third Type of Examples

3.1 General Description

Figure 3:
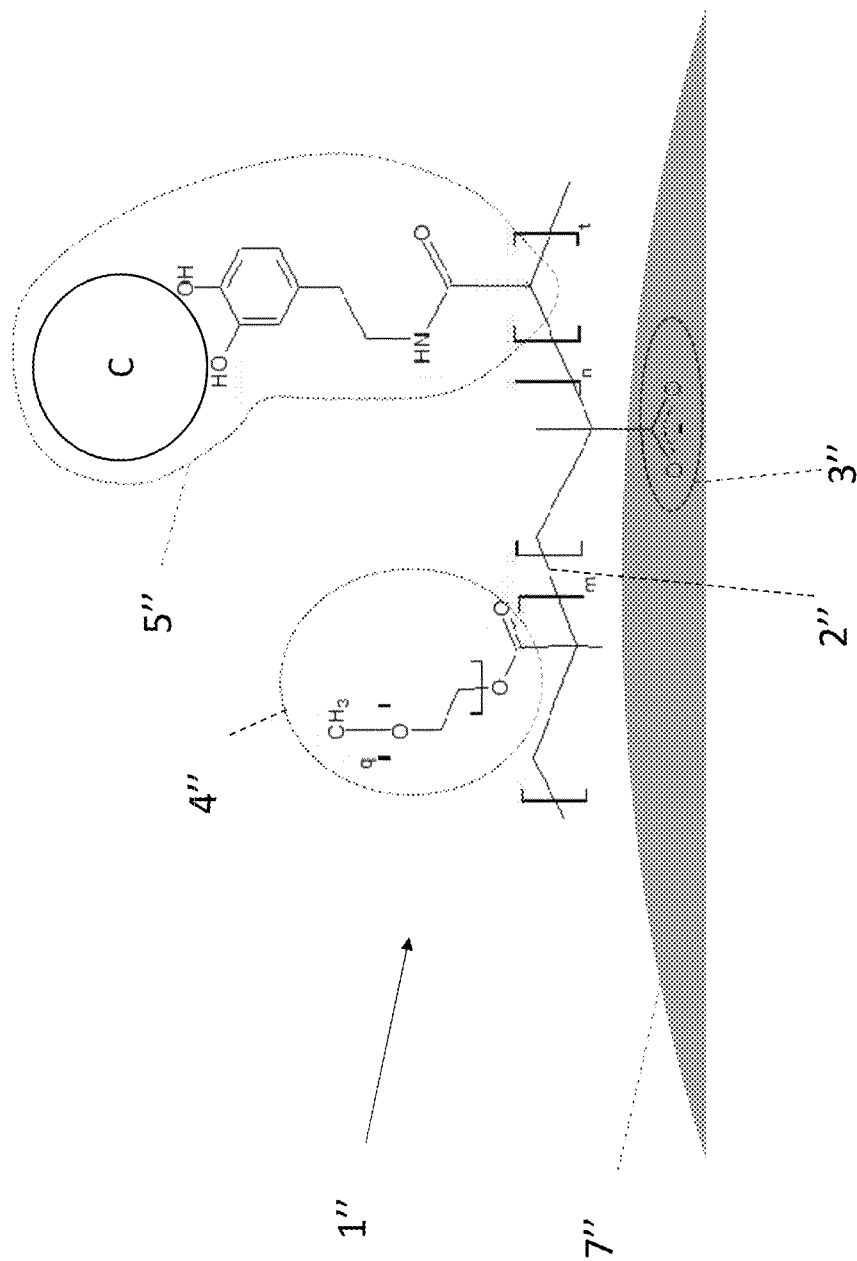
FIG. 3 shows a schematic illustration of a third example of an admixture according to the present invention.

A third example of an admixture according to the present invention is schematically represented in FIG. 3. The admixture 1" comprises a backbone 2" provided with at least one first functionality 3" and at least one second functionalities 5". Optionally, the backbone 2" is further provided with one or more additional functionalities 4". Examples of such additional functionalities 4" are functionalities comprising a sterically active group.

The backbone 2" comprises a polymer backbone for example a polymer backbone comprising acrylic, methacrylic, maleic acid, and related monomers, possibly grafted with one or more polyoxyalkylene side chains such as polyethylene oxide (PEO) and/or polypropylene oxide (PPO). The grafting may comprise, but is not limited to ester, ether, amide and/or imide.

The at least one first functionality 3" comprises for example a negatively charged group, such as a COO$^-$ group, adapted to adsorb to the cement particles 7" of the cementitious material.

The at least one second functionality 5" comprises one or more magnetizable nanoparticles C, for example one or more Fe$_3$O$_4$ particles. The Fe$_3$O$_4$ particles are for example connected to the backbone 2" by dopaminemethacrylate (DMA), based on catechol.

The Fe$_3$O$_4$ particles as shown in FIG. 3 are added to the cementitious material as polymer functionalized particles adapted to adsorb to the cement particles of the cementitious material by means of the negatively charged groups 3".

When a sufficient amount of polymer functionalized particles is attracted to the surface of the cement particles 7", the cement particles 7" become magnetizable particles.

When no magnetic field is applied, the magnetizable cement particles 7" will be dispersed in the cementitious material. Possibly, a superplasticizer known in the art is added to the cementitious material to influence or improve the dispersion.

When a magnetic field is applied, the magnetizable cement particles 7" will respond to the imposed magnetic field lines and will start forming a cluster of connected particles along these field lines. This means that by the activation of the magnetic field the rheology of the cementitious material is influenced by influencing the interparticle interaction between magnetizable cement particles 7" in a reversible way.

3.2 Synthesis and Responsiveness a. Synthesis of Redox-Responsive Copolymers

Three different admixtures (copolymers) referred to as Polydopa2, Polydopa5 and Polydopa10 are synthesized starting from dopamine (DOPA), methyl acrylate (MAA) and poly(ethylene glycol)methacrylate ($M_n$ 500 Da) (PEGMA$_{500}$) with feed molar ratio as given in Table

TABLE 1

| copolymer | [DOPA] | [MAA] | [PEGMA$_{500}$] |
|---|---|---|---|
| Polydopa2 | 2 | 49 | 49 |
| Polydopa5 | 5 | 47.5 | 47.5 |
| Polydopa10 | 10 | 45 | 45 | b. Experimental Verification of Plasticizing Efficacy

Figure 7:
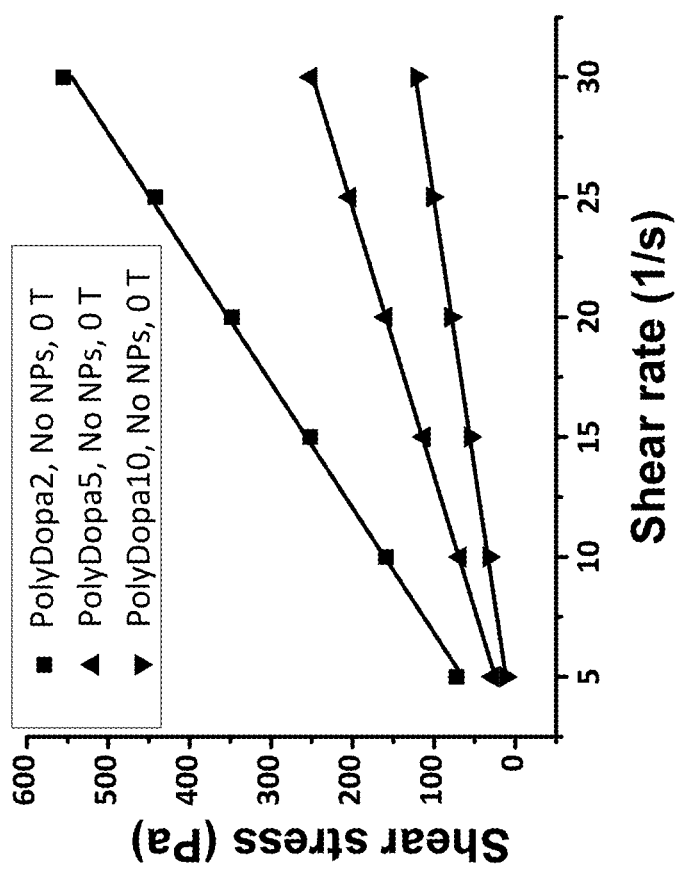
FIG. 7 shows the shear stress as a function of shear rate of pastes (W/C of 0.35) comprising an admixture of the third type (Polydopa2, Polydopa5 and Polydopa10) without addition of magnetic particles.

The plasticizing effect of the polymers Polydopa2, Polydopa5 and Polydopa10 was evaluated by rheometry. Cement pastes having a water to cement ratio of 0.35, with Polydopa2, Polydopa5 and Polydopa10 with a polymer concentration of 1% (mass % relative to cement), without magnetic nanoparticles, were prepared. The paste samples were loaded in a parallel plate rheometer (Anton Paar®) and sample conditions were checked. The results (shear stress as a function of shear rate) of the different pastes are given in FIG. 7. FIG. 7 indicates that there is a plasticizing effect and that the effect is increasing with an increasing percentage of DOPA in the copolymer. This suggests adsorption of the copolymer to cement grains and also suggests that DOPA is contributing to the steric hindrance.

c. Experimental Verification of Responsive Effect by Applying a Magnetic Field

The influence of a magnetic field on the rheological properties of paste comprising magnetic nanoparticles was evaluated using rheometry. Cement pastes having a water to cement ratio of 0.3, with Polydopa2, Polydopa5 and Polydopa10 with a polymer concentration of 1% (mass % relative to cement) and 1% magnetic nanoparticles ($Fe_3O_4$ particles with an average particle size of 20 nm). were prepared.

Figure 8A:
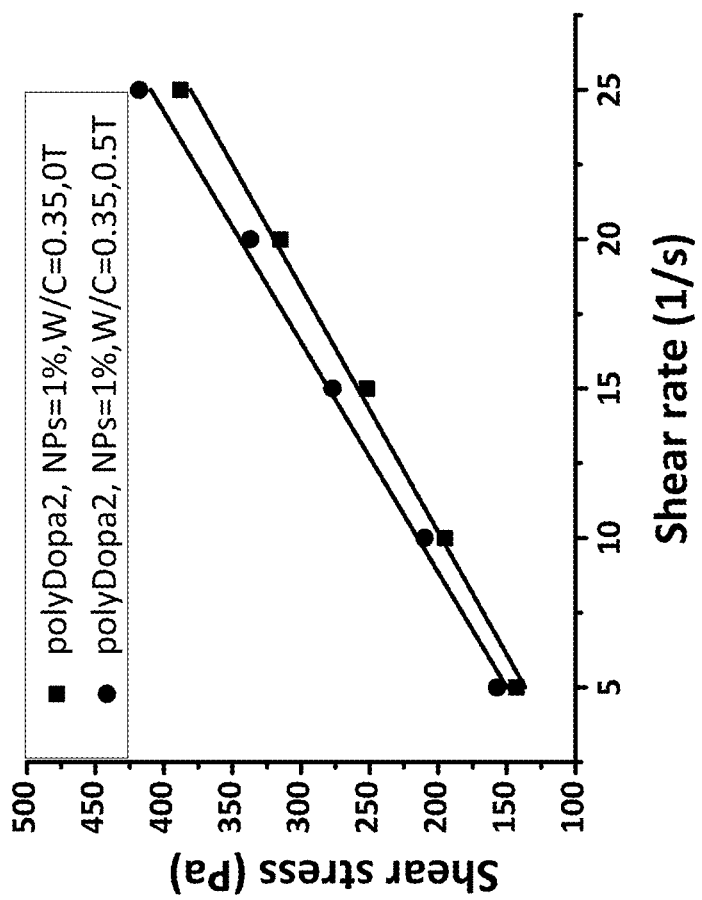
FIG. 8a, FIG. 8b and FIG. 8c show the shear stress as a function of shear rate of three pastes (W/C of 0.35) comprising an admixture of the third type (Polydopa2, Polydopa5 and Polydopa10)) with the addition of magnetic particles without and with the application of a magnetic field.
Figure 8B:
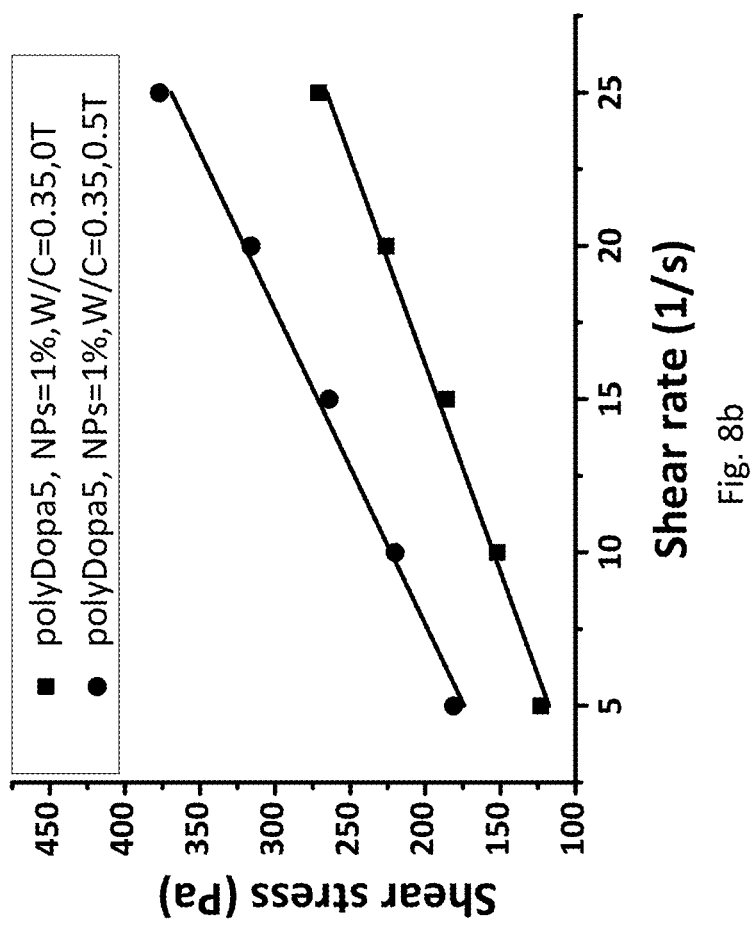
Figure 8C:
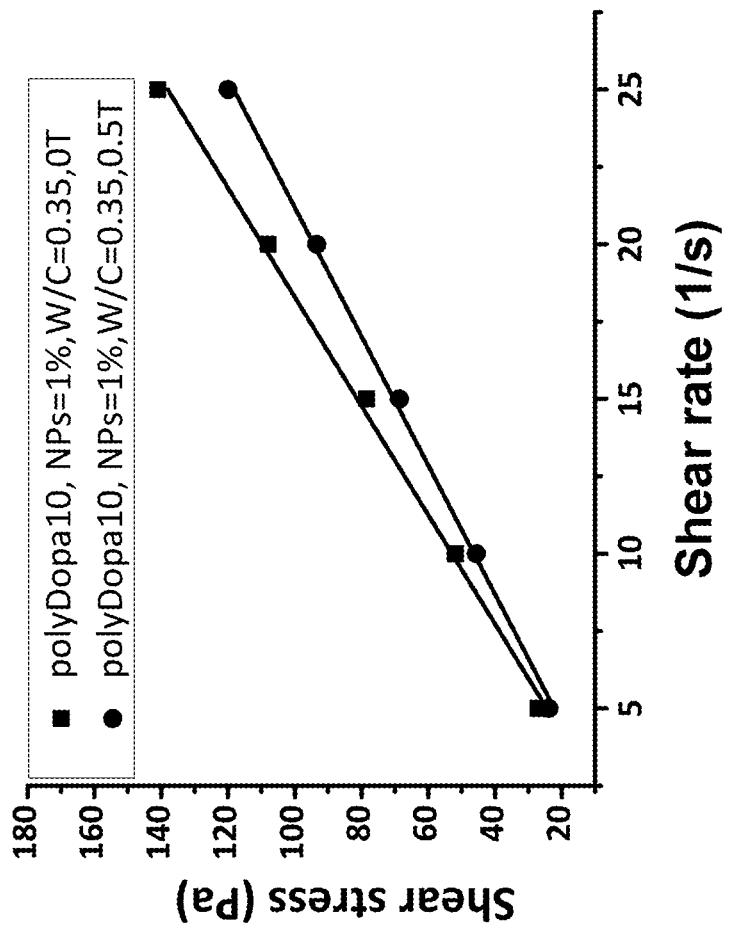

The results (shear stress as a function of shear rate) of the different pastes without the application of a magnetic field and with the application of a magnetic field (0.5 T) are given in FIG. 8a (Polydopa2), FIG. 8b (Polydopa5) and FIG. 8c (Polydopa10). FIG. 8a, FIG. 8b and FIG. 8c indicate that there is a clear influence of the magnetic field on the flow curves and thus that the rheological behaviour is controllable by applying a magnetic field. For Polydopa2 (FIG. 8a) the application of a magnetic field induces a slight effect of reduced flowability; for Polydopa5 (FIG. 8b) the application of a magnetic field results in a more pronounced effect showing a clearly reduced flowability and for Polydopa 10 (FIG. 8c) the application of a magnetic field induces a slight effect improving the flowability.

d. Responsive Effect, SAOS with Magnetic Field (Storage Modulus G')

The storage modulus G' as a function of time was determined using an Anton Paar® rheometer. Cement pastes having a water to cement ratio of 0.3, with Polydopa2 (FIG. 9a, Polydopa5 (FIG. 9b) and Polydopa10 (FIG. 9c) with a polymer concentration of 1% (mass % relative to cement) and 1% magnetic nanoparticles were prepared.

Tests were performed without magnetic field and with the application of a magnetic field (0.5 T).

Figure 9A:
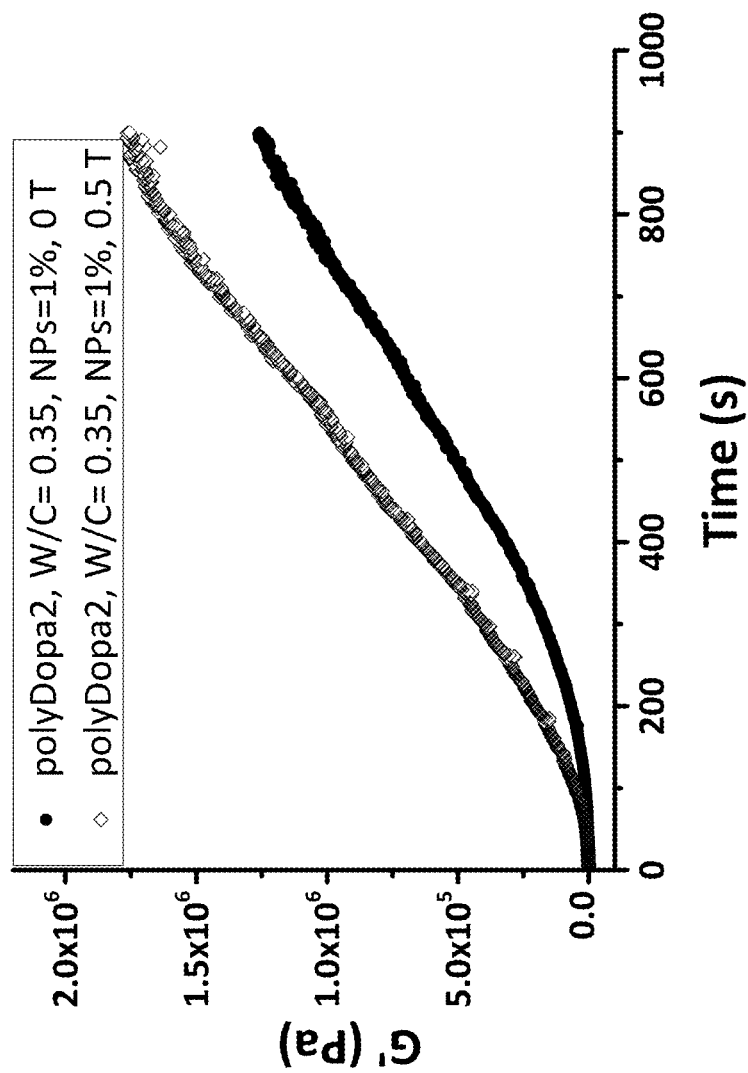
FIG. 9a, FIG. 9b and FIG. 9c show the storage modulus G' as a function of time of three pastes comprising an admixture of the third type (Polydopa2, Polydopa5 and Polydopa10) with the addition of magnetic particles without and with the application of a magnetic field.
Figure 9B:
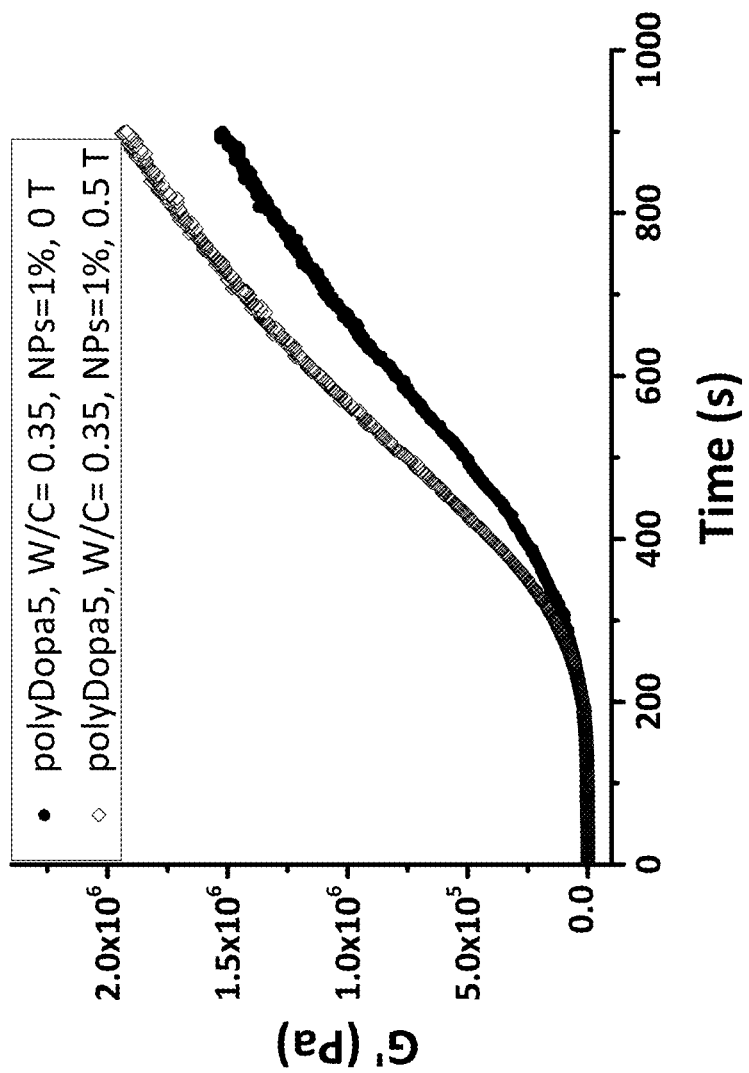
Figure 9C:
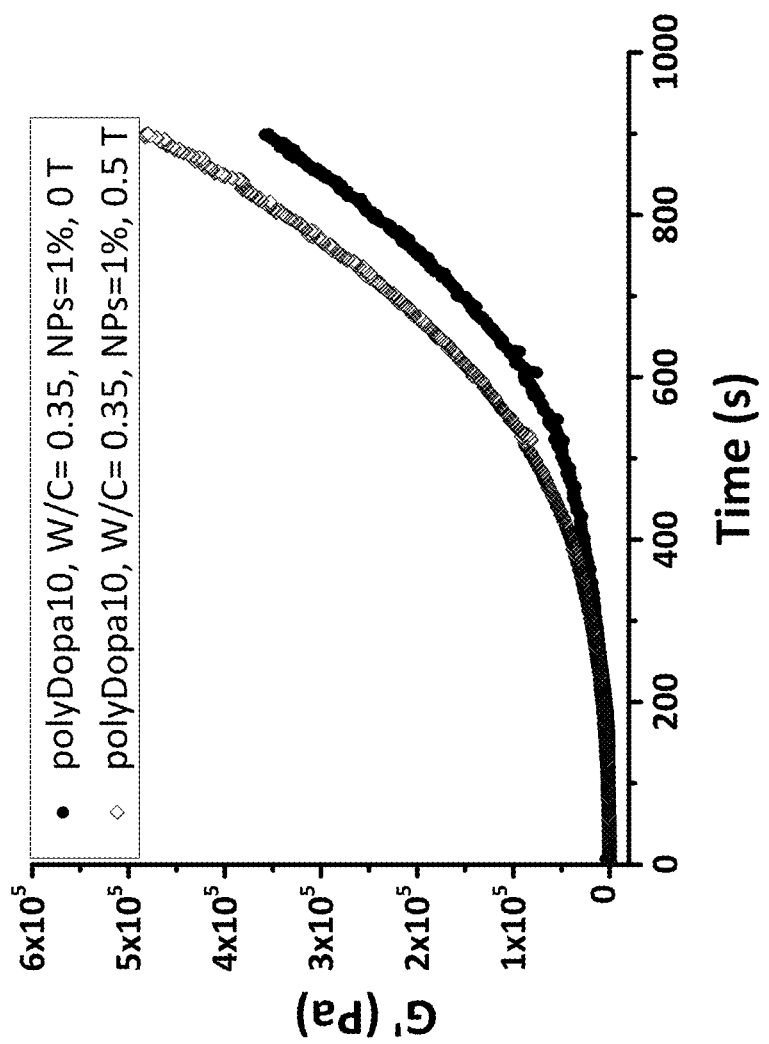

FIG. 9a, FIG. 9b and FIG. 9c indicate that there is a clear influence of the magnetic field on the development of stiffness modulus (G'). For Polydopa2 (FIG. 9a) and Polydopa5 (FIG. 9b) the application of a magnetic field induces a pronounced effect with resulting an in increased G'. For Polydopa10 (FIG. 9c) the application of a magnetic field induces a less pronounced effect. Nevertheless, the experimental results clearly suggest that the development of G' is controllable with the magnetic field.

The invention claimed is:

1. A method to control or influence rheological properties of a cementitious material, said method comprising the steps of
   providing a flow of a cementitious material comprising an admixture, the admixture comprising cement particles and a compound comprising a backbone chain, said backbone chain being provided with at least one first functionality and at least one second functionality; said at least one first functionality being adapted to adsorb to said cement particles, said at least one second functionality being adapted to respond by activating, deactivating or changing an external trigger signal, said external trigger comprising an electric field, a magnetic field or an electromagnetic field, said responding of said at least one second functionality is influencing said rheological properties of said cementitious material by influencing said adsorption of said at least one first functionality with said cement particles and/or by influencing the interparticle interaction between said cement particles,
   conveying said flow of a cementitious material through a channel and optionally through a nozzle;
   applying said flow of said cementitious material in a formwork or to a work surface; and
   activating, deactivating and/or changing an external trigger signal to activate or deactivate said at least one second functionality, said external trigger comprising an electric field, a magnetic field or an electromagnetic field.

2. The method according to claim 1, further comprising the step of determining the rheological properties of said cementitious material and activating, deactivating or changing said external trigger signal in case said rheological properties do not fall within a predetermined range.

3. The method according to claim 1, wherein said activating, deactivating and/or changing of said external trigger signal influences the adsorption of said first functionality to cement particles of said cementitious material.

4. The method according to claim 1, wherein said activating, deactivating and/or changing of said external trigger signal influences the interparticle interaction between cement particles of said cementitious material.

5. The method according to claim 1, wherein said activating, deactivating and/or changing of said external trigger signal influences the steric effect provided by said at least one second functionality and/or induces a reorganization of said at least one second functionality.

6. The method according to claim 1, wherein the compound in the admixture comprises a water-soluble compound.

7. The method according to claim 1, wherein said at least one second functionality provides a steric effect and is adapted to respond to an external trigger signal thereby changing said steric effect of said at least one second functionality.

8. The method according to claim 1, wherein said at least one second functionality comprises a compound comprising at least one localized site or group adapted to be oxidized or adapted to be reduced by activating, deactivating and/or changing said external trigger signal.

9. The method according to claim 1, wherein said second functionality comprises at least one magnetizable component.

* * * * *